(12) United States Patent
Hsu et al.

(10) Patent No.: US 10,078,186 B1
(45) Date of Patent: Sep. 18, 2018

(54) FIBER OPTIC CONNECTOR

(71) Applicants: Gloriole Electroptic Technology Corp., Kaohsiung (TW); Shen Zhen Wonderwin Technology Co., Ltd., Shenzhen, Guangdong Province (CN)

(72) Inventors: Shu-Hui Hsu, Kaohsiung (TW); Yen-Chang Lee, Kaohsiung (TW)

(73) Assignees: Gloriole Electropic Technology Corp., Kaohsiung (TW); Shen Zhen Wonderwin Technology Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 15/814,888

(22) Filed: Nov. 16, 2017

(30) Foreign Application Priority Data

Jul. 20, 2017 (TW) .............................. 106210645 U

(51) Int. Cl.
 *G02B 6/36* (2006.01)
(52) U.S. Cl.
 CPC .................. *G02B 6/3604* (2013.01)
(58) Field of Classification Search
 CPC .... G02B 6/3604; G02B 6/3504; G02B 27/28; G02B 6/3893
 See application file for complete search history.

(56) References Cited

U.S. PATENT DOCUMENTS

| | | | |
|---|---|---|---|
| 8,152,385 B2 | 4/2012 | De Jong et al. | |
| 8,727,638 B2* | 5/2014 | Lee | G02B 6/3879 385/139 |
| 9,625,658 B1* | 4/2017 | Lin | G02B 6/387 |
| 2006/0089049 A1* | 4/2006 | Sedor | G02B 6/3879 439/620.21 |
| 2012/0155810 A1* | 6/2012 | Nakagawa | G02B 6/3878 385/78 |

* cited by examiner

*Primary Examiner* — Ellen Kim
(74) *Attorney, Agent, or Firm* — Muncy, Geissler, Olds & Lowe, P.C.

(57) ABSTRACT

A fiber optic connector includes a carrier unit and two insertion units. The carrier unit includes a carrier body that defines two spaced-apart receiving spaces extending therethrough. Each receiving space has an opening formed in one side opposite to the other receiving space. Each insertion unit is configured to have an optical fiber extending therethrough, and is removably inserted into a respective receiving space through the opening so as to be disposed in a first or second position. Each insertion unit is rotated 180 degrees to change its position from the first to the second position or vice versa for polarity reversal. A sleeve unit is removably sleeved on the carrier body and covers the openings of the receiving spaces when sleeved on the carrier body.

6 Claims, 18 Drawing Sheets

FIBER OPTIC CONNECTOR

CROSS-REFERENCE TO RELATED APPLICATION

This application claims priority of Taiwanese Patent Application No. 106210645, filed on Jul. 20, 2017.

FIELD

The disclosure relates to a connector, more particularly to a fiber optic connector.

BACKGROUND

Referring to FIGS. 1 to 5, a duplex fiber optic connector assembly 1, as disclosed in U.S. Pat. No. 8,152,385, includes a housing 11, first and second fiber optic connector assemblies (12A, 12B) inserted into the housing 11 and attached to optical fibers (19A, 19B) issuing from a fiber optic cable 19, a crimp band 18 for securing the fiber optic cable 19 to the housing 11, a trigger mechanism 13 removably engaged to the housing 11 and latch mechanisms on the first and second optical fiber connector assemblies (12A, 12B), and a boot 14 fitted over a portion of the fiber optic cable 19 and the crimp band 18 and abutting against the housing 11. The housing 11 includes two housing components 111 mated to each other, and two parallel apertures 112 cooperatively defined by the mated housing components 111 and respectively receiving and retaining portions of the first and second connector assemblies (12A, 12B) in such a manner as to allow rotation for polarity reversal. The fiber optic connector assemblies (12A, 12B) are independently rotatable along their respective axes for polarity reversal within the housing 11. Fiber optic cable 19 enters the housing components 111 and its optical fibers (19A, 19B) are respectively attached to each fiber optic connector assembly (12A, 12B).

With reference to FIGS. 3 to 5, to reverse the position of the fiber optic connector assemblies (12A, 12B), the boot 14 is rotated about 45 degrees from a normally assembled position, and the trigger mechanism 13 is slidably removed from the housing 11. Next, the fiber optic connector assembly (12B) is rotated (see FIG. 3), and is continuously rotated for about 180 degrees until it is in the position, as shown in FIG. 4. Thereafter, the fiber optic connector assembly (12A) is also rotated, but in the opposite direction of the fiber optic connector assembly (12B), for about 180 degrees until it is in the position, as shown in FIG. 4. Consequently, both of the fiber optic connector assemblies (12a, 12B) are about 180 degrees from their initial position. Then, the trigger mechanism 13 is reinstalled, but on the other side of the housing 11. FIG. 4 shows the newly installed trigger mechanism 13 on the assembly after polarity reversal, but still in its original view for clarity, and prior to boot 14 rotation. The entire assembly is rotated about 180 degrees, as shown in FIG. 5, to reveal the polarity reversal for the duplex fiber optic cable assembly 1. In other words, the positions of the fiber optic connector assemblies (12a, 12B) are reversed from where they were in FIG. 2.

During the polarity reversal operation, the fiber optic connector assemblies (12A, 12B) are rotated between housing halves 111 of the housing 11. However, if there is no way to directly view the fiber optic connector assemblies (12A, 12B), the optical fibers (19A, 19B) may be twisted relative to the fiber optic connector assemblies (12A, 12B) during repeated rotation thereof, so that the positioning relationship thereof is likely to loosen. As a result, during rotation of the fiber optic connector assemblies (12A, 12B), it is likely that the optical fibers (19A, 19B) cannot be rotated, thereby affecting the polarity reversal operation.

Moreover, the LC (Lucent/Local connector) type fiber optic connector usually has 5.25 mm and 6.25 mm standards. If the standard of the fiber optic connector assembly 1 can be directly changed according to the requirement without changing the product to another standard, the efficiency thereof may be enhanced.

SUMMARY

Therefore, an object of the present disclosure is to provide a fiber optic connector that can alleviate at least one of the drawbacks of the prior art.

According to the disclosure, a fiber optic connector extends along an insertion direction and includes a carrier unit, two insertion units and a sleeve unit. The carrier unit includes a carrier body that defines two spaced-apart receiving spaces extending therethrough along the insertion direction. Each of the receiving spaces has an opening formed in one side opposite to the other one of the receiving spaces and extending along the insertion direction. The insertion units extend along the insertion direction. Each of the insertion units is configured to have an optical fiber extending therethrough, and is removably inserted into a respective one of the receiving spaces through the opening so as to be disposed in a first position or a second position opposite to the first position. Each of the insertion units is rotated 180 degrees to change its position from the first position to the second position or vice versa for polarity reversal. The sleeve unit is removably sleeved on the carrier body and covers the openings of the receiving spaces when sleeved on the carrier body.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
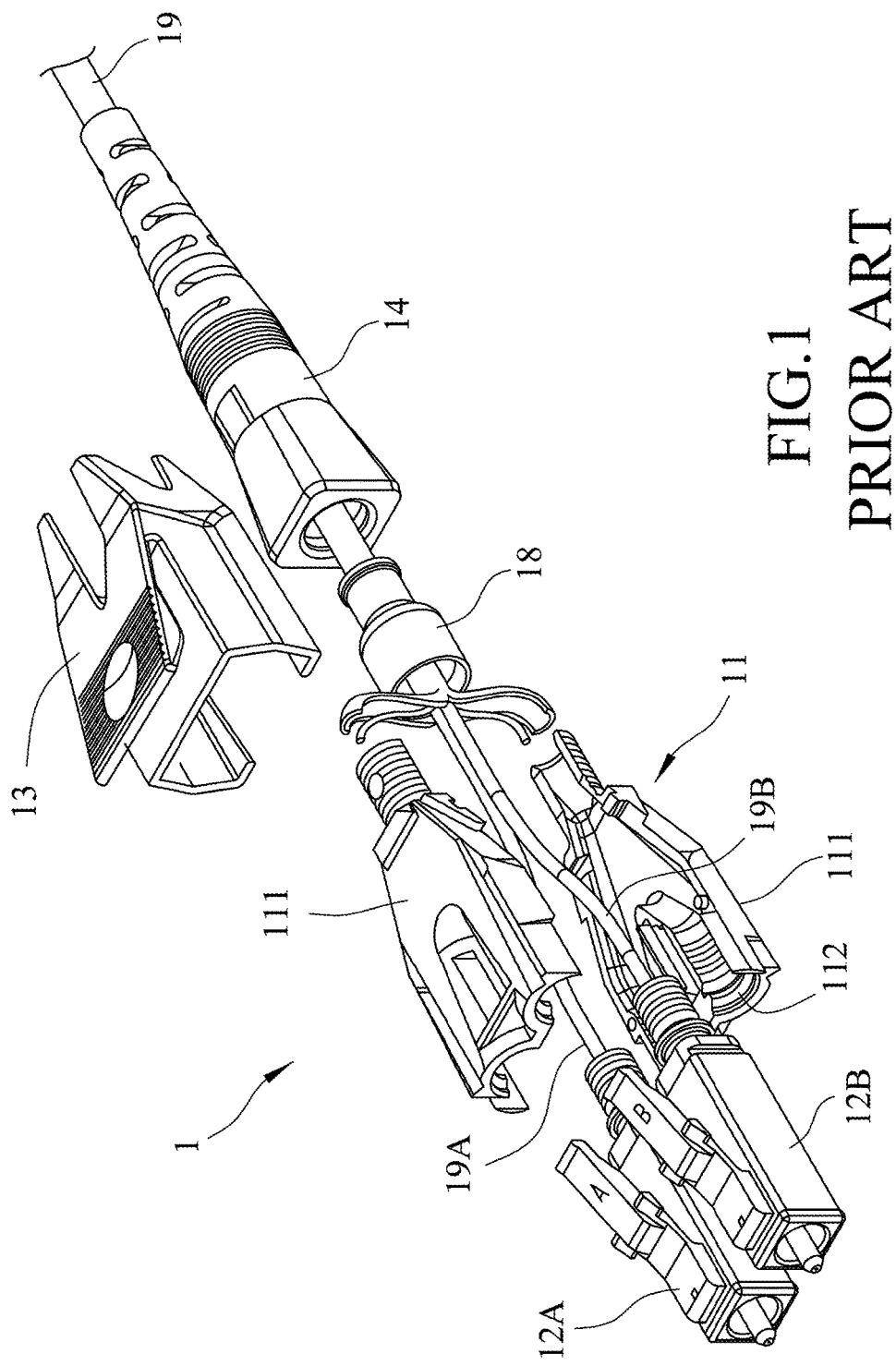
FIG. 1 is an exploded perspective view of a duplex fiber optic connector assembly as disclosed in U.S. Pat. No. 8,152,385.
Figure 2:
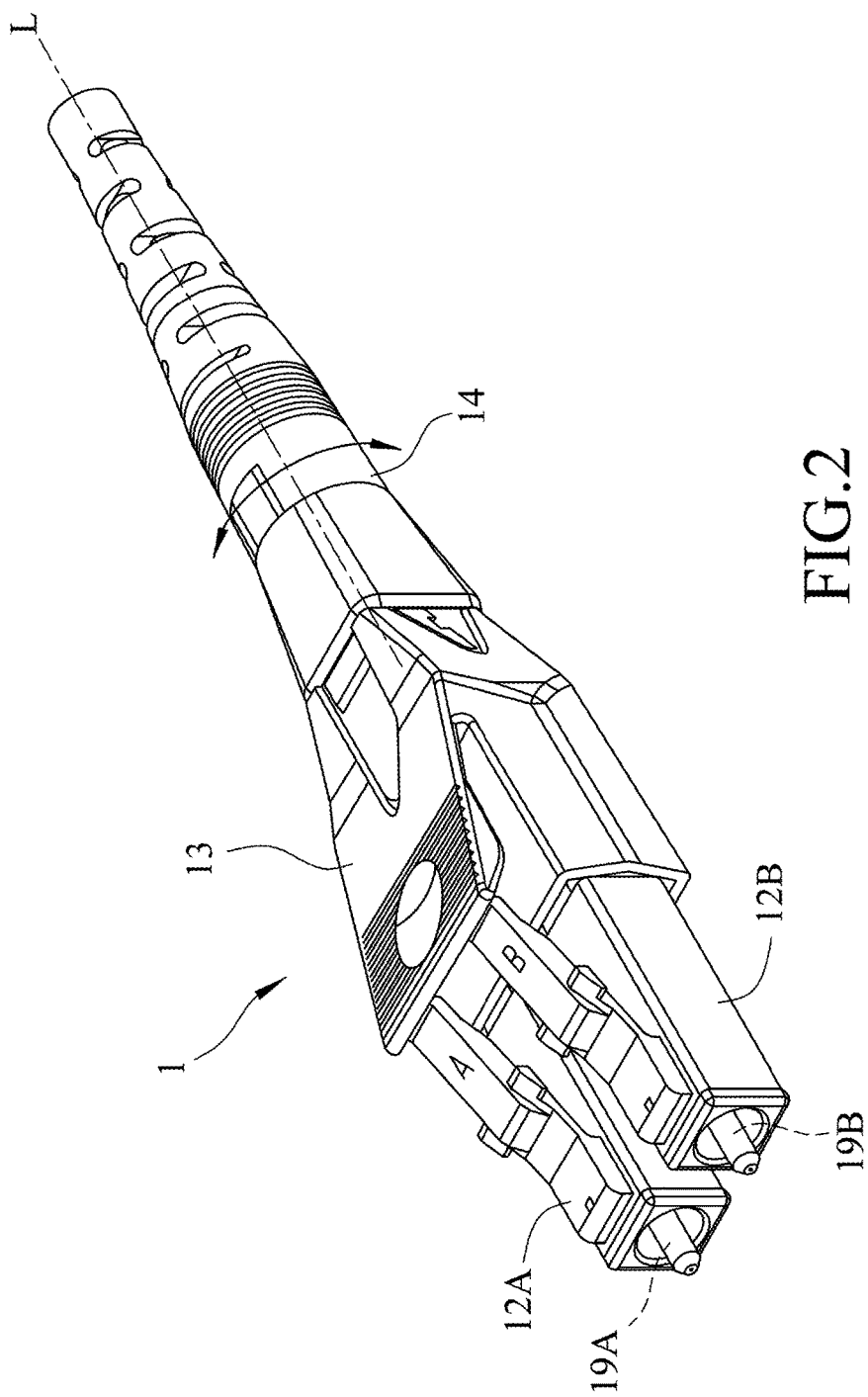
FIG. 2 is an assembled perspective view of FIG. 1.
Figure 3:
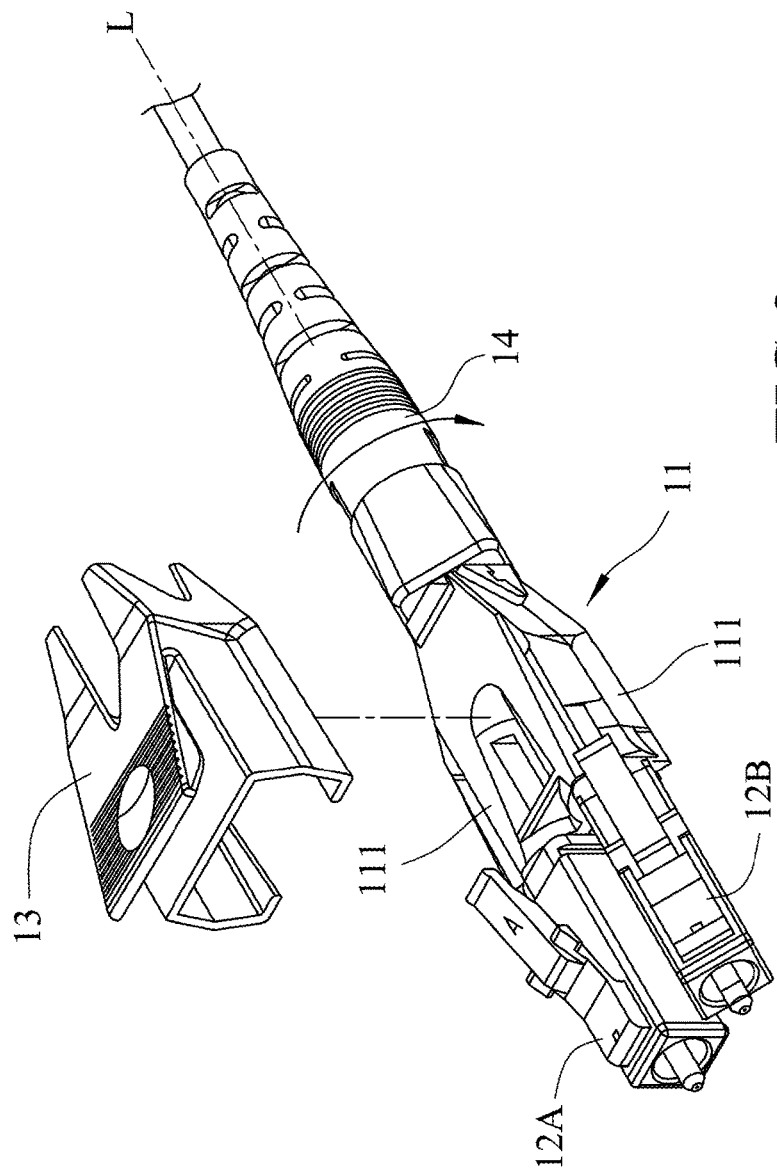
FIG. 3 illustrates a trigger mechanism being removed from a housing of the duplex fiber optic connector assembly and a boot being rotated for conducting a polarity reversal operation.
Figure 4:
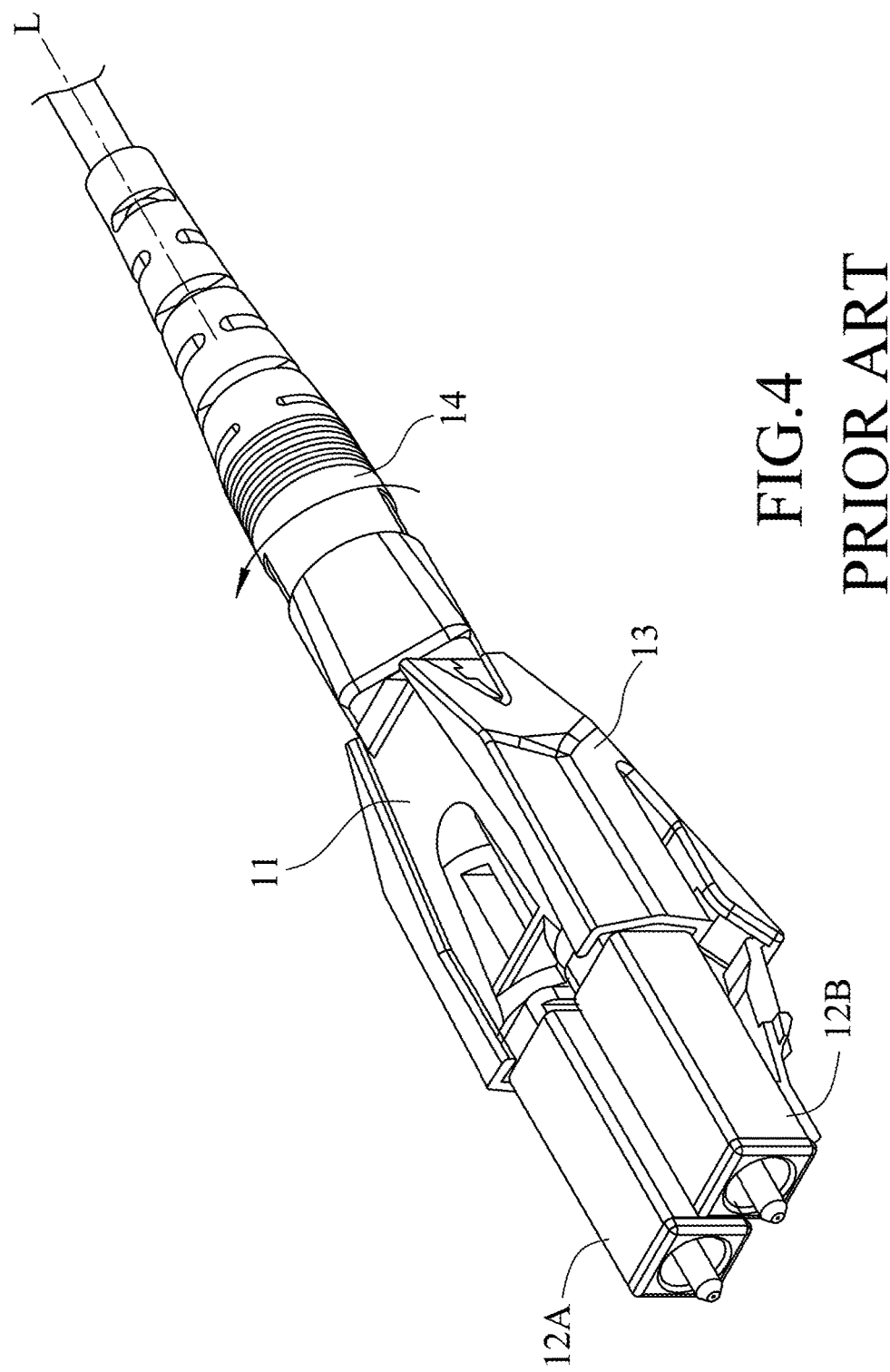
FIG. 4 illustrates the boot being rotated in opposite direction after fiber optic connector assemblies of the duplex fiber optic connector assembly are rotated.
Figure 5:
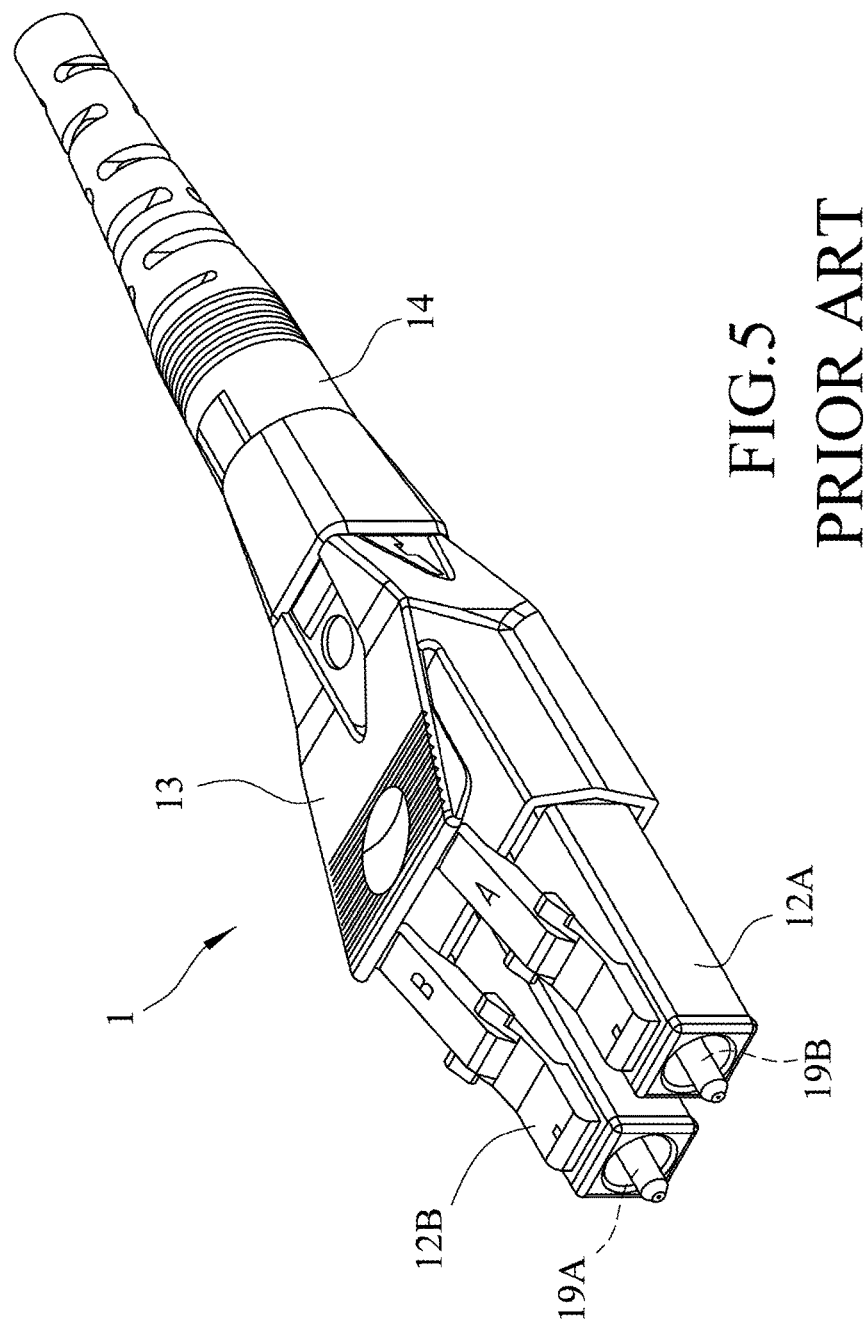
FIG. 5 illustrates the entire assembly being rotated 180 degrees to reveal the polarity reversal for the duplex fiber optic cable assembly.
Figure 6:
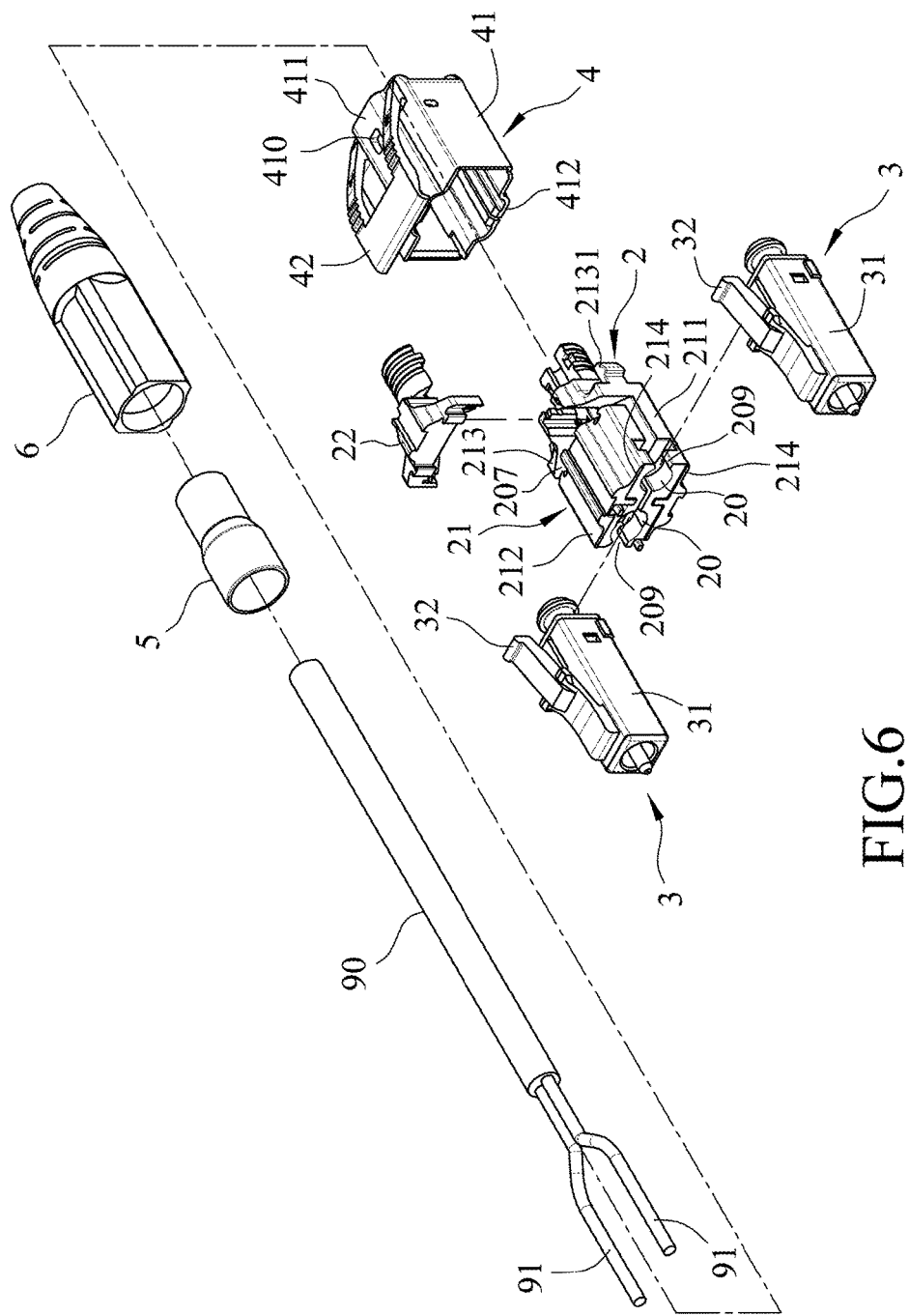
FIG. 6 is an exploded perspective view of a fiber optic connector according to the embodiment of the present disclosure.
Figure 7:
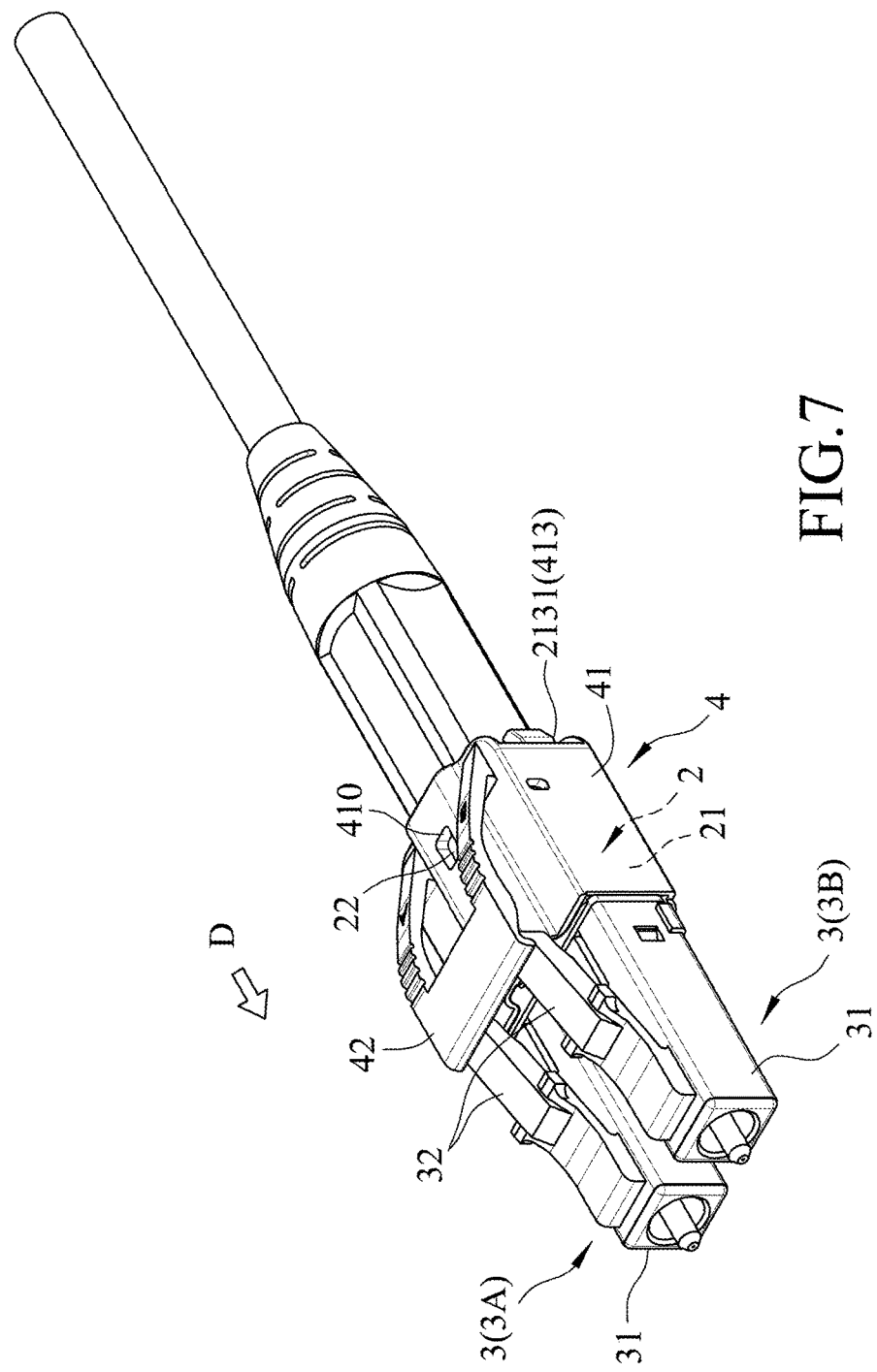
FIG. 7 is an assembled perspective view of the embodiment, illustrating insertion units of the embodiment in a first position.
Figure 8:
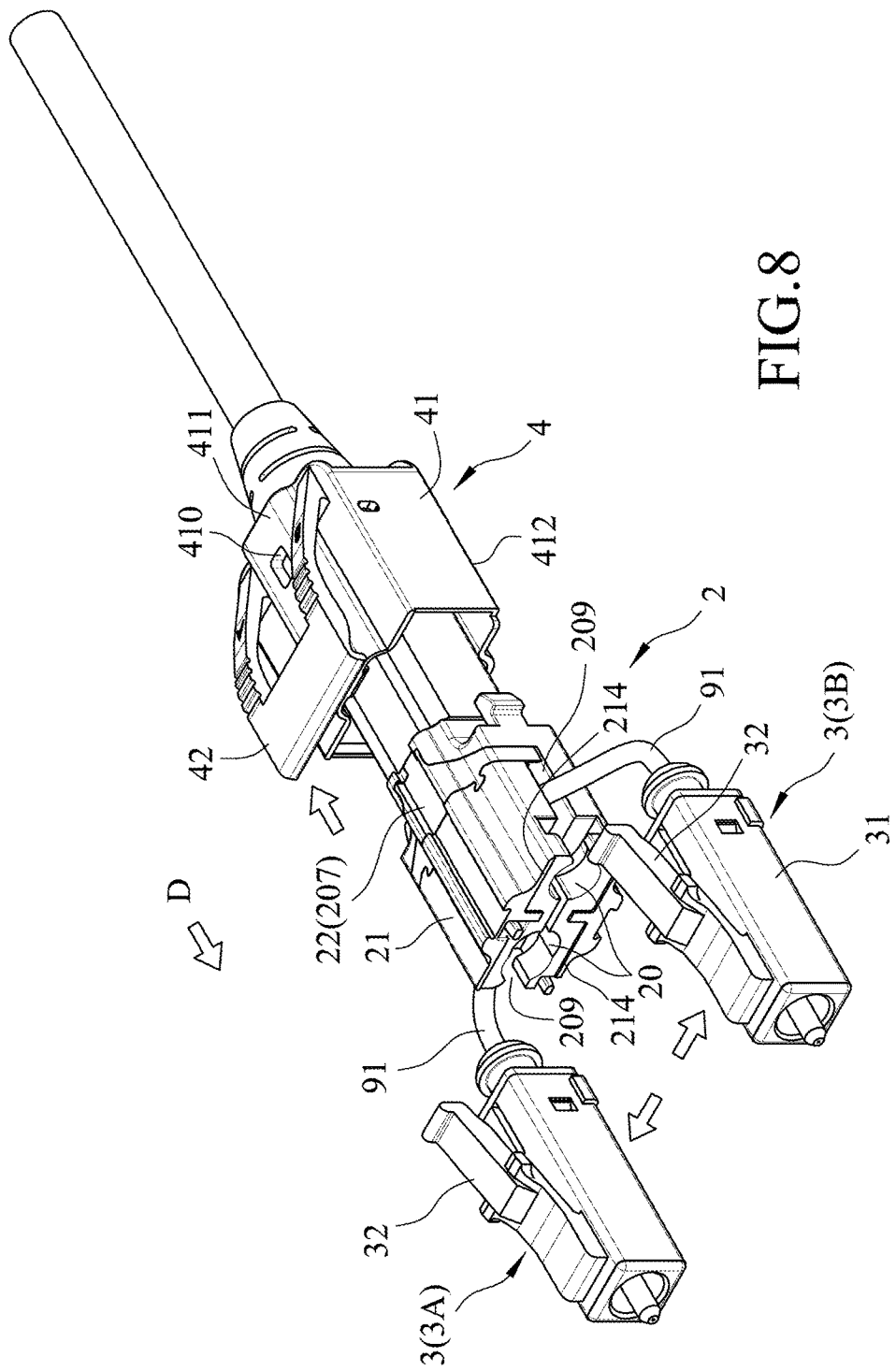
FIG. 8 illustrates how the insertion units of the embodiment are removed from a carrier body.

Referring to FIGS. 6 to 8, a fiber optic connector according to the embodiment of the present disclosure extends along an insertion direction (D), and includes a carrier unit 2, two insertion units 3, and a sleeve unit 4.

The carrier unit 2 includes a carrier body 21 defining two spaced-apart receiving spaces 20 extending therethrough along the insertion direction (D), and an indicating piece 22 disposed in the carrier body 21. The carrier body 21 includes a lower wall 211, an upper wall 212 connected to and cooperating with the lower wall 211 to define the receiving spaces 20, a rear wall 213 connected to a rear end of the lower wall 211 and spaced apart from a rear end of the upper wall to form a receiving gap 207, and two limiting portions 214 respectively protruding from front ends of the lower and upper walls 211, 212 and extending along the insertion direction (D). Each receiving space 20 has an opening 209 formed in one side opposite to the other receiving space 20 and extending along the insertion direction (D). The rear wall 213 has two latches 2131 respectively protruding from two opposite ends thereof in a direction opposite to the insertion direction (D). The indicating piece 22 is inserted into the receiving gap 207 and is positioned thereat.

Figure 12:
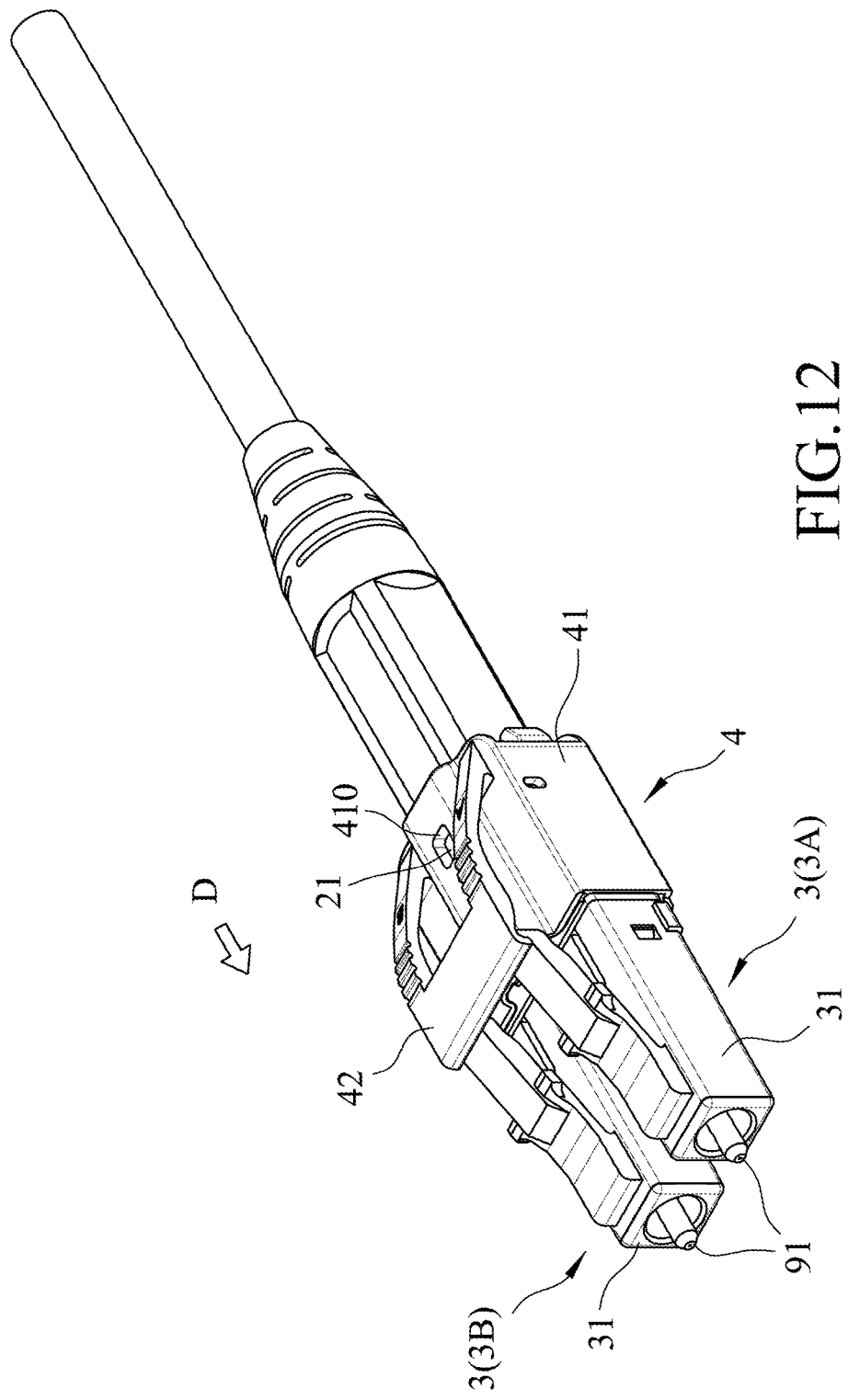
FIG. 12 illustrates the insertion units of the embodiment in a second position opposite to the first position.

Each insertion unit 3 includes a casing 31, and a positioning member 32 connected to one side of the casing 31 and extending obliquely therefrom in a direction opposite to the insertion direction (D). To facilitate description of the specification, numeral "3A" denotes one of the insertion units 3, while numeral "3B" denotes the other insertion unit 3. Each insertion unit (3A, 3B) is removably received in a respective one of the receiving spaces 20. Specifically, each insertion unit (3A, 3B) is received in the respective receiving space 20 by inserting a rear end portion thereof into the respective receiving space 20 through the opening 209 such that a front end portion of each insertion unit (3A, 3B) protrudes out of the carrier body 21, and is removed from the respective receiving space 20 by moving the rear end portion thereof out of the respective receiving space 20 through the opening 209. Through this configuration, each insertion unit (3A, 3B) can be selectively disposed in the respective receiving space 20 in a first position, as shown in FIG. 7, or a second position opposite to the first position, as shown in FIG. 12.

Two optical fibers 91 of a fiber optic cable 90 are respectively inserted through the insertion units (3A, 3B), and are secured to the carrier body 21 through a crimp band 5. The optical fibers 91 have different polarities. A boot 6 is fitted over a portion of the fiber optic cable 90 and the crimp band 5, and abuts against the carrier body 21.

The sleeve unit 4 includes a sleeve body 41 having opposite upper and lower plates 411, 412, and an engaging member 42 connected to the upper plate 411 and extending obliquely therefrom along the insertion direction (D). The sleeve body 41 further has two spaced-apart latching holes 413 (not visible in FIG. 6) formed in a rear end thereof for receiving respectively and removably the latches 2131.

With reference to FIG. 7, when each insertion unit (3A, 3B) is disposed in the respective receiving space 20 in the first position, the sleeve body 41 is sleeved on the carrier body 21 and the engaging member 42 thereof is engaged with the positioning members 32 of the insertion units (3A, 3B), thereby covering the openings 209 of the receiving spaces 20. Removal of the insertion units (3A, 3B) from the respective receiving spaces 20 via the openings 209 can thus be prevented. At this time, the insertion unit (3A) is located on the left side of FIG. 7, while the insertion unit (3B) is located on the right side of FIG. 7.

Figure 9:
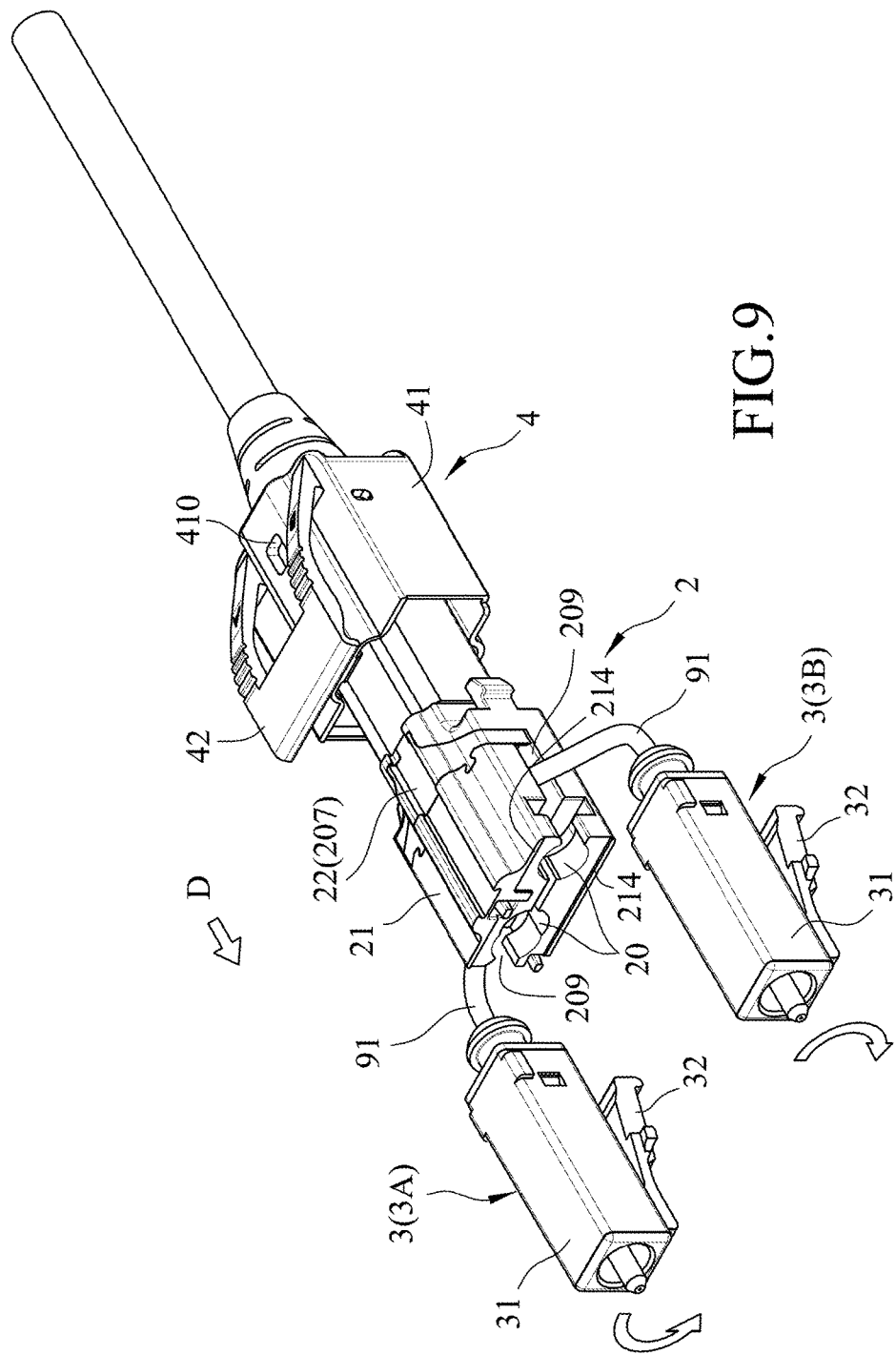
FIG. 9 is a view similar to FIG. 8, but illustrating the insertion units being rotated 180 degrees in opposite directions.
Figure 10:
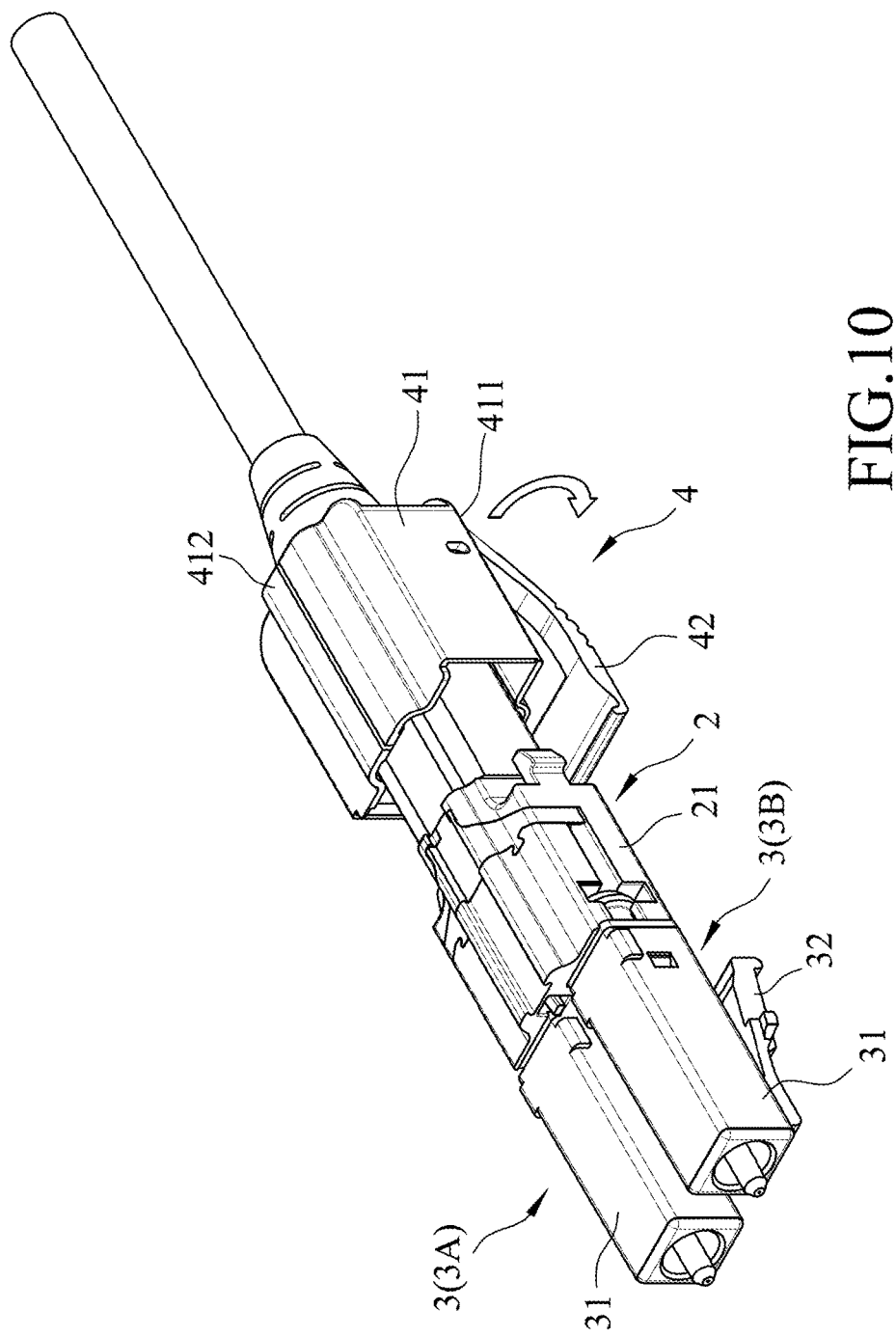
FIG. 10 illustrates a sleeve unit being rotated to match the insertion units.
Figure 11:
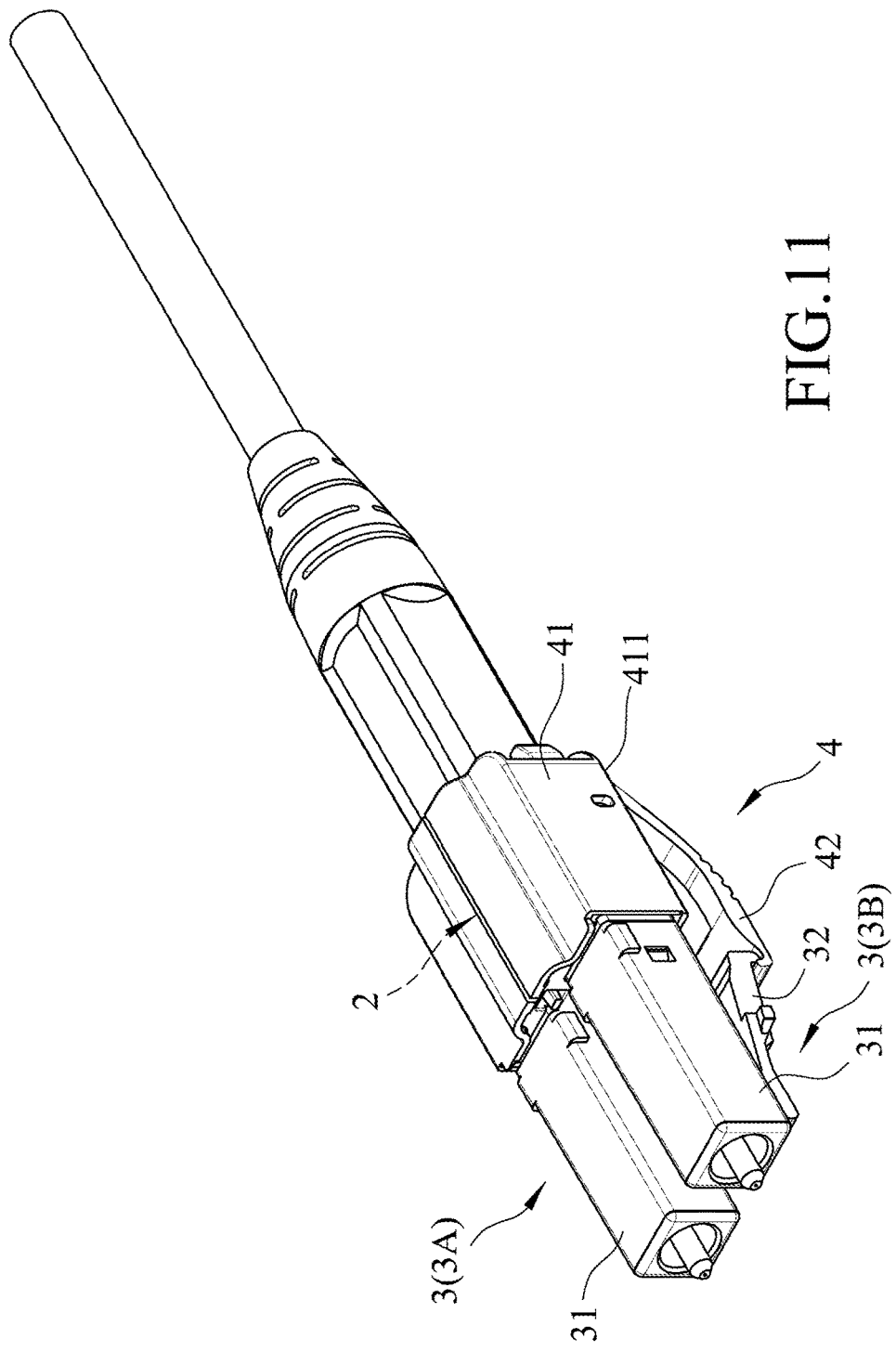
FIG. 11 is a view similar to FIG. 10, but with the sleeve unit being sleeved on the carrier body.

Referring to FIGS. 9 to 12, in combination with FIG. 8, to change the position of each insertion unit (3A, 3B) from the first position to the second position so as to change the polarity arrangement of the optical fibers 91, the sleeve unit 4 is first moved away with force from the carrier body 21 in the direction opposite to the insertion direction (D) after disengaging the latches 2131 from the respective latching holes 413. The insertion units (3A, 3B) are then removed from the respective receiving spaces 20 through the openings 209 thereof. Next, the insertion units (3A, 3B) are rotated 180 degrees in opposite directions, as shown in FIG. 9, and are then inserted back into the respective receiving spaces 20 through the openings 209, as shown in FIG. 10. Thereafter, the sleeve unit 4 is rotated 180 degrees, as shown by the arrow in FIG. 10, to match the insertion units (3A, 3B), and is then sleeved back onto the carrier body 21, as shown in FIG. 11, with the latches 2131 engaging the latching holes 413 and with the engaging member 412 engaging the positioning members 32. The entire assembly is then rotated 180 degrees, as shown in FIG. 12, thereby placing each insertion unit (3A, 3B) in the second position. At this time, the insertion unit (3A) is located on the right side, while the insertion unit (3B) is located on the left side. Further, the polarity of the optical fibers 91 is reversed.

It is worth to mention herein that in order for a user to easily recognize the relative position of the insertion units (3A, 3B) from an exterior of the fiber optic connector of this embodiment so as to confirm the polarity of the optical fibers 91, as shown in FIG. 7, when the sleeve unit 4 is sleeved on the carrier body 21 with the insertion units (3A, 3B) in the first position, the indicating piece 22 is exposed through a window 410 of the sleeve body 41. The indicating piece 22 may be made of a color different from that of the carrier body 21 or may be designed with a letter or word, so that the position of the insertion units (3A, 3B) can be quickly determined, that is, whether the insertion units (3A, 3B) are in the first or second position so as to confirm the polarity of the optical fibers 91. The positioning members 32 of the insertion units (3A, 3B) are located on the same side whether the insertion units (3A, 3B) are in the first or second position.

Figure 13:
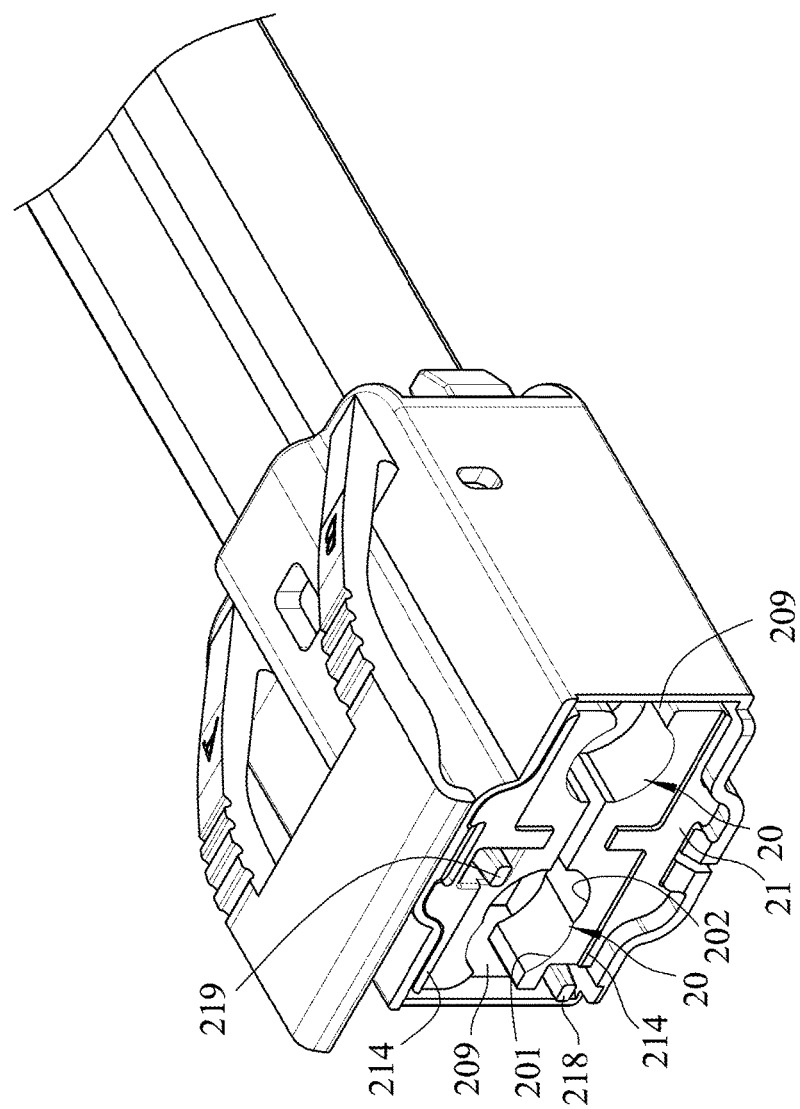
FIG. 13 illustrates one of receiving spaces of the carrier body including a first receiving part and a second receiving part, and the carrier body having a plurality of limiting portions.
Figure 14:
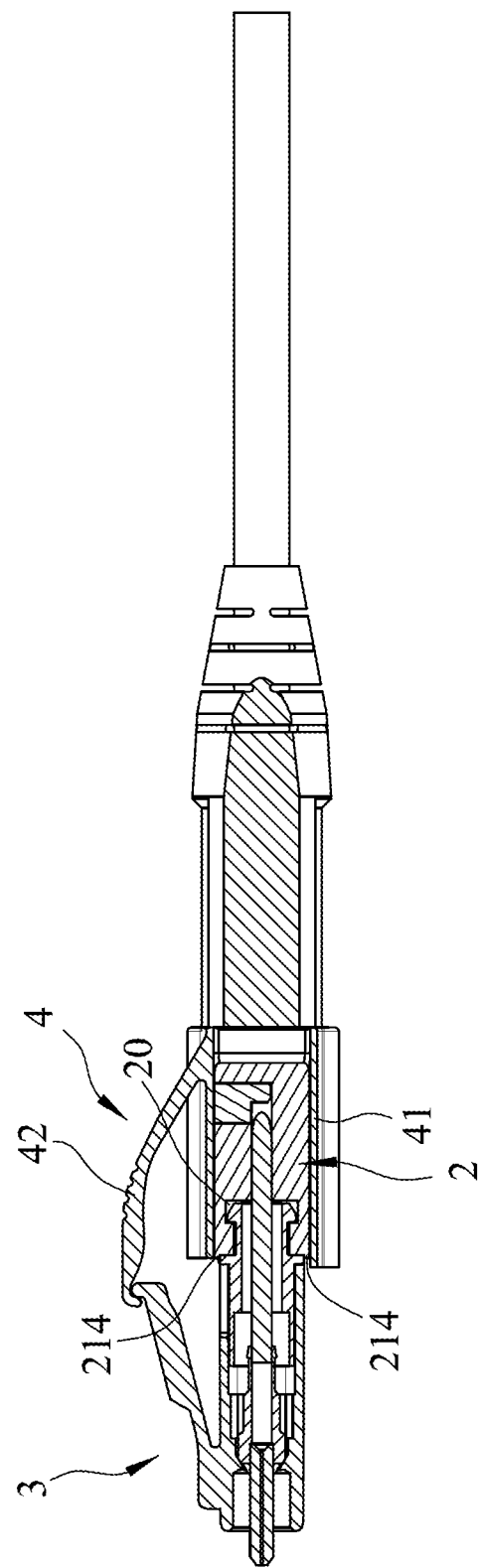
FIG. 14 is an assembled sectional view of the embodiment, illustrating how the limiting portions limit the insertion units.
Figure 15:
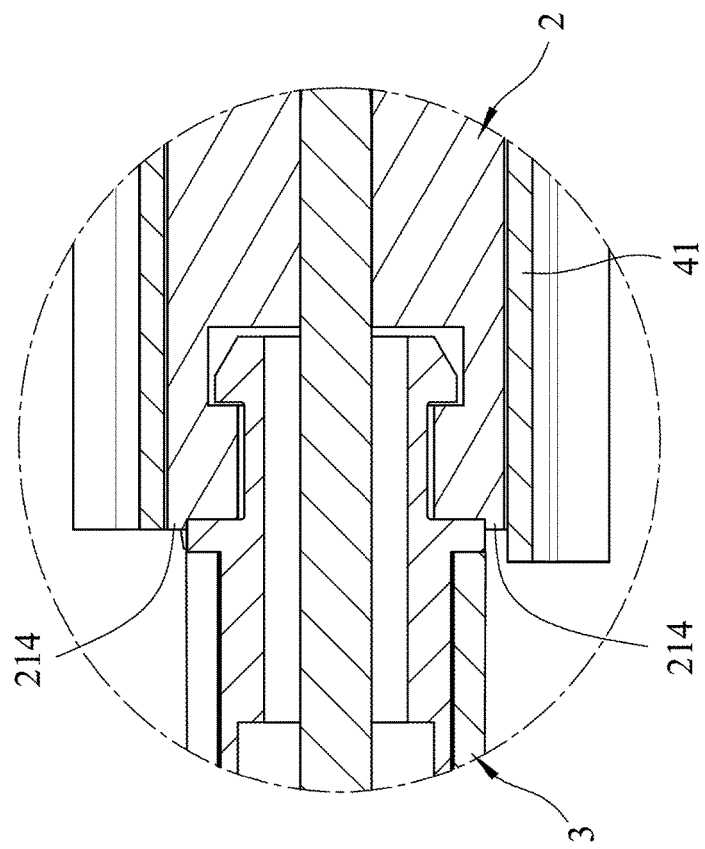
FIG. 15 is an enlarged sectional view of a portion of FIG. 14.

Referring to FIG. 13, one of the receiving spaces 20 includes a first receiving part 201 proximate to the opening 209 thereof, and a second receiving part 202 proximate to the other receiving space 20 and arranged side by side with the first receiving part 201. The carrier body 21 has a first protrusion 218 that protrudes therefrom, that extends along the insertion direction (D) and that is spaced apart from the first receiving part 201, and a second protrusion 219 that protrudes therefrom, that extends along the insertion direction (D) and that is spaced apart from the second receiving part 201. The limiting portions 214 can cooperatively surround and limit the insertion units (3A, 3B) inserted into the respective receiving spaces 20, as shown in FIGS. 14, and 15, to prevent the user from directly rotating the insertion units (3A, 3B) upon insertion into the receiving spaces 20. Further, because each insertion unit (3A, 3B) is removed first from the respective receiving space 20 through the opening 209 before it is rotated, the user can easily and visually confirm the relative position between the insertion units (3A, 3B) and the optical fibers 91, so that twisting of the optical fibers 91 can be prevented due to repeated rotation in the same direction. Thus, the positioning of the insertion units (3A, 3B) in the respective receiving spaces 20 and the function of polarity reversal can be maintained.

Figure 16:
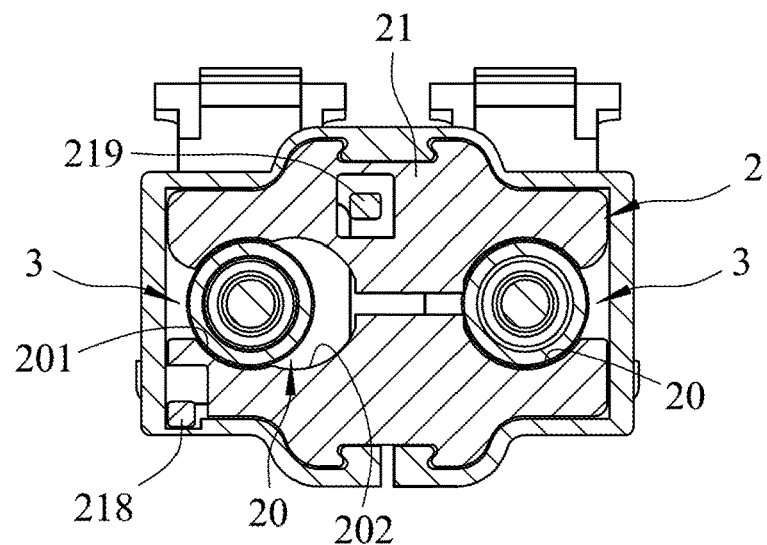
FIG. 16 is a sectional view, illustrating one of the insertion units disposed in the first receiving part.
Figure 17:
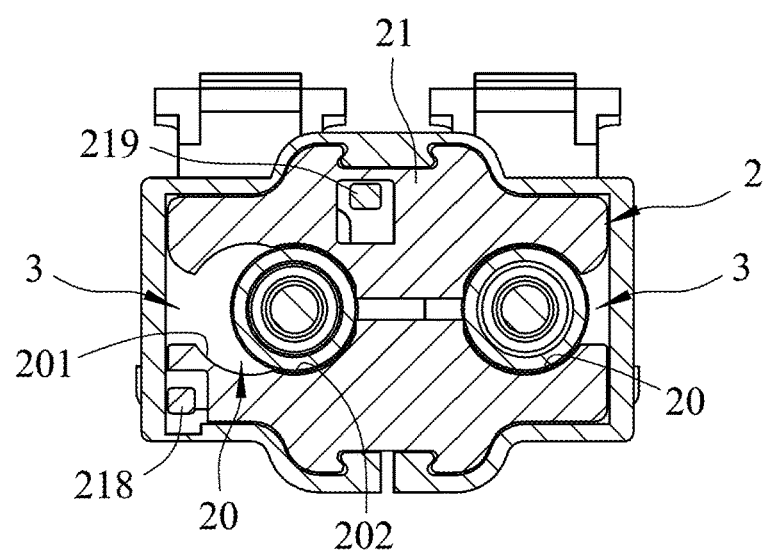
FIG. 17 is a view similar to FIG. 16, but illustrating the one of the insertion units disposed in the second receiving part.
Figure 18:
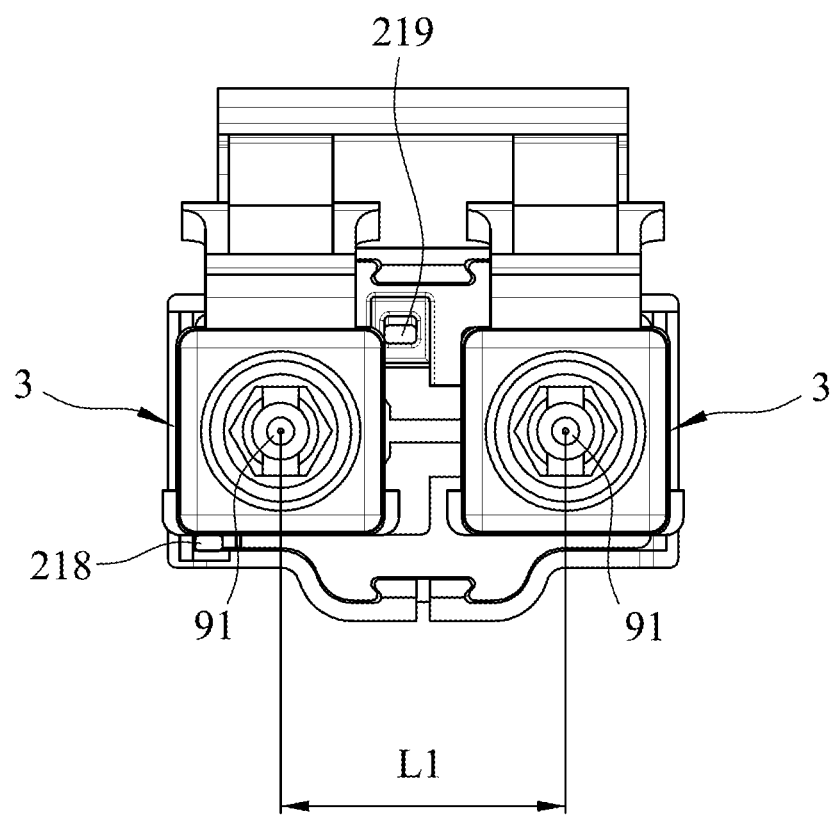
FIG. 18 is a schematic view, illustrating a distance between optical fibers in the insertion units as L1.
Figure 19:
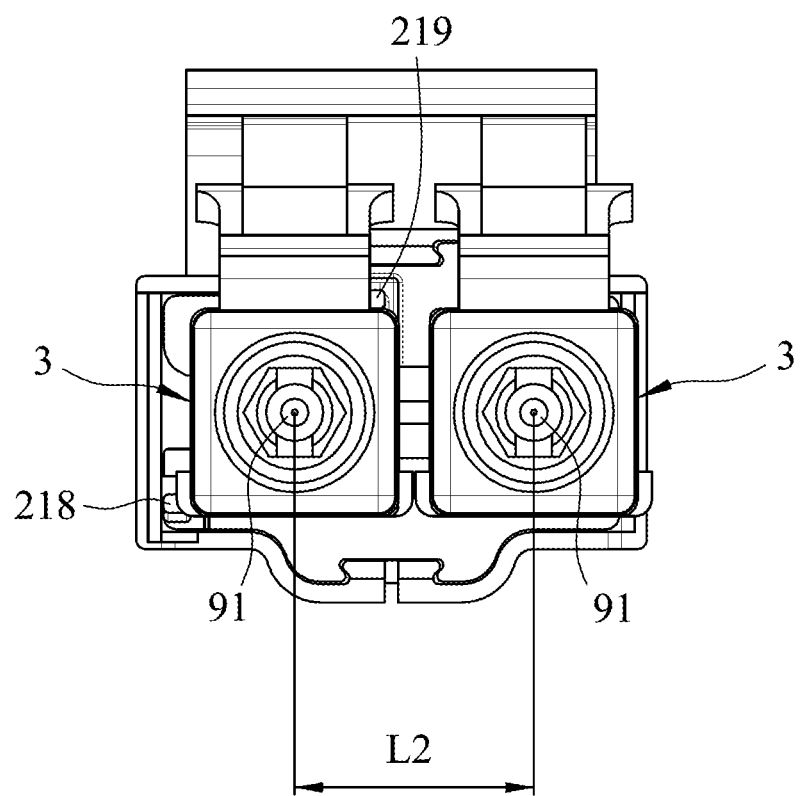
FIG. 19 is a view similar to FIG. 18, but illustrating the distance between the optical fibers in the insertion units as L2.

One of the insertion units 3 can be disposed in a selected one of the first receiving part 201, as shown in FIG. 16, or the second receiving part 202, as shown in FIG. 17. Since the distance between the first receiving part 201 and the other receiving space 20 is longer than that between the second receiving part 202 and the other receiving space 20, when the one of the insertion units 3 is inserted into the selected one of the first or second receiving part 201, 202, the distance between the insertion units 3 is changed to conform with the specified standard. Specifically, when the one of the insertion units 3 is inserted into the first receiving part 201, the optical fibers 91 therein are spaced apart by a distance (L1) of 6.25 mm, as shown in FIG. 18. On the other hand, when the one of the insertion units 3 is inserted into the second receiving part 202, the optical fibers 91 therein are spaced apart by a distance (L2) of 5.25 mm, as shown in 19. The distance between the first or second receiving part 201, 202 and the other receiving space 20 can meet the above standard, but is not limited thereto. The one of the insertion units 3 abuts against the first protrusion 218 when it is disposed in the first receiving part 201, and abuts against the second protrusion 219 when it is disposed in the second receiving part 202. The effect of fixing the one of the insertion units 3 is achieved.

In sum, in the optic fiber connector of this disclosure, to reverse the polarity of the optical fibers 91, the insertion units 3 are first removed from the respective receiving spaces 20 through the openings 209 thereof, are rotated to change the positions thereof, and are then inserted back into the respective receiving spaces 20 through the openings 209. Thus, the polarity reversal of the optical fibers 91 can be visually determined and confirmed. Further, through the configuration of the first and second receiving parts 201, 202, by moving the position of one of the insertion units 3, the distance between the insertion units 3 can be adjusted to meet the required standard. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector extending along an insertion direction, comprising:
   a carrier unit including a carrier body that defines two spaced-apart receiving spaces extending therethrough along the insertion direction, each of said receiving spaces having an opening formed in one side opposite to the other one of said receiving spaces and extending along the insertion direction;
   two insertion units extending along the insertion direction, each of said insertion units being configured to have an optical fiber extending therethrough, and being removably inserted into a respective one of said receiving spaces through said opening so as to be disposed in a first position or a second position opposite to the first position, each of said insertion units being rotated 180 degrees to change its position from the first position to the second position or vice versa for polarity reversal; and
   a sleeve unit removably sleeved on said carrier body and covering said openings of said receiving spaces when sleeved on said carrier body,
   wherein one of said receiving spaces includes a first receiving part proximate to said opening thereof, and a second receiving part proximate to the other one of said receiving spaces and arranged side by side with said first receiving part, one of said insertion units being inserted into a selected one of said first and second receiving parts to change the distance between said insertion units.

2. The fiber optic connector as claimed in claim 1, wherein said carrier body has at least one limiting portion that protrudes therefrom, that extends along the insertion direction and that surrounds portions of said insertion units for positioning the same.

3. The fiber optic connector as claimed in claim 1, wherein said carrier body has a first protrusion that protrudes therefrom, that extends along the insertion direction and that is spaced apart from said first receiving part, and a second protrusion that protrudes therefrom, that extends along the insertion direction and that is spaced apart from said second receiving part, and wherein said one of said insertion units abuts against said first protrusion when it is disposed in said first receiving part, and abuts against said second protrusion when it is disposed in said second receiving part.

4. The fiber optic connector as claimed in claim 1, wherein each of said insertion units includes a casing, and a positioning member connected to one side of said casing and extending obliquely therefrom in a direction opposite to the insertion direction, said positioning members of said insertion units being located on the same side whether said insertion units are in the first or second position.

5. The fiber optic connector as claimed in claim 4, wherein said sleeve unit includes a sleeve body, and an engaging member connected to one side of said sleeve body and extending obliquely therefrom along the insertion direction, said sleeve unit matching with said insertion units such that said engaging member can removably engage said positioning members of said insertion units whether said insertion units are in the first or second position.

6. The fiber optic connector as claimed in claim 5, wherein said carrier body includes an upper wall and a rear wall spaced apart from a rear end of said upper wall to form a receiving gap, said carrier unit further including an indicating piece disposed in said receiving gap, said sleeve body having a window, said indicating piece being exposed through said window when said sleeve unit is sleeved on said carrier body and when said insertion units are in the first position.

\* \* \* \* \*